United States Patent Office 3,606,399
Patented Sept. 20, 1971

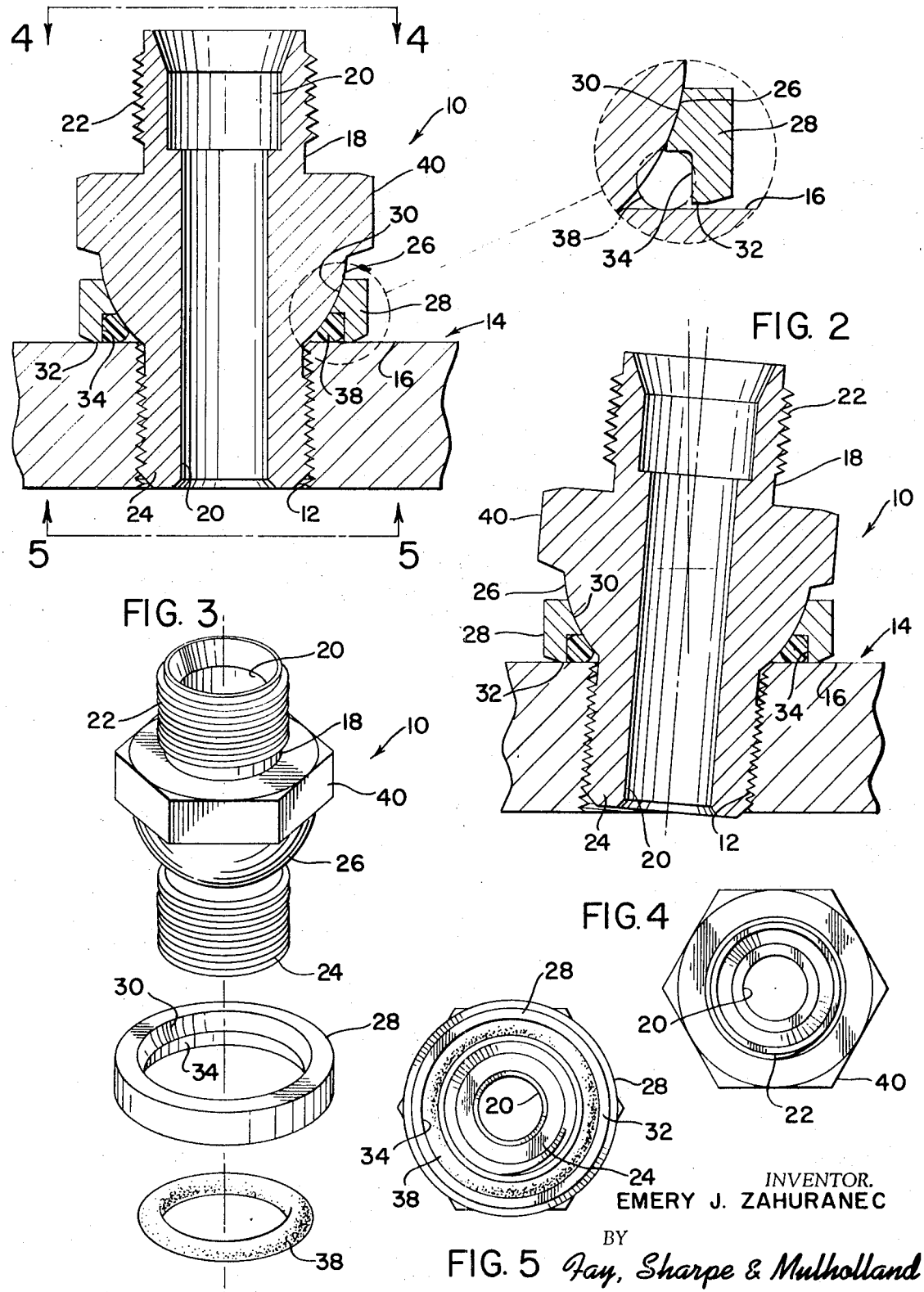

3,606,399
O-SEAL FITTING
Emery J. Zahuranec, Solon, Ohio, assignor to
Crawford Fitting Company, Solon, Ohio
Filed Apr. 30, 1970, Ser. No. 33,222
Int. Cl. F16l *15/00*
U.S. Cl. 285—220
9 Claims

ABSTRACT OF THE DISCLOSURE

An O-seal fitting of the type used for connecting pipe or tubes to threaded ports. The disclosed fitting comprises a body member with an axial flow passage and a first threaded end portion adapted to be received in the threaded port. The opposite end portion is preferably arranged for connection to a pipe or tube through a standard coupling or the like. Seal means are positioned about the body to provide a fluid tight seal between the body and the outer end of the threaded port. The seal means shown in the drawings include a surface formed on the body member intermediate the ends and surrounding the first threaded end portion. An annular, relatively rigid ring member having an axial opening substantially larger than the diameter of the threaded end is positioned on the body and in engagement with the body surface. The ring member and the body surface are arranged so they can shift relative to one another. Preferably, the ring member has a concave spherical surface and the body surface is a convex spherical surface for engaging the body. On the side of the ring member opposite the spherical surface there is a recess which extends about the body and receives an O-ring seal that engages the body, the ring, and the surface surrounding the port. Because of the arrangement of the body portion and the ring, the ring can shift to assure proper mating and sealing of the O-ring with the area surrounding the threaded port even when the area is not perpendicular to the axis of the port.

---

The subject invention is directed toward the art of pipe or tube joints and, more particularly, to an improved fitting of the type generally referred to as an O-seal fitting.

The invention is suited for use in connectors or adapters of the type used for connecting tubing to threaded ports and will be described with particular reference thereto; however, it will be understood that the invention is capable of broader application and can be used in many types of pipe and tube fittings.

One type of connector or adapter fitting often used for connecting tubing to threaded openings in plates, bulkheads, or the like, comprises a body having an axial flow passage with a threaded male end portion adapted to be received in the plate opening. A second end portion at the opposite end of the passage is adapted to be connected to the tubing. Generally, a flange having wrench pads extends radially outwardly from between the end portions. Pressure sealing between the fitting and the plate is provided by an O-ring seal positioned in an annular groove formed on the flange about the male end portion. As the fitting is tightened into the threaded opening in the plate, the O-ring is compressed between the surface of the plate and the flange. Preferably, metal-to-metal contact takes place between the plate and the outer periphery of the sealing face of the flange to prevent extrusion of the O-ring under pressure.

The type of fitting described above is in wide spread use and is generally satisfactory for most installations. Problems have been encountered, however, especially in field installations. The problems generally result when the axis of the threaded opening is not closely perpendicular to the surface of the plate. In such case, the sealing surface of the flange, which is perpendicular to the axis of the fitting, is not parallel with the surface of the plate. As a consequence, the O-ring is not uniformly compressed and proper metal-to-metal contact does not take place between the outer periphery of the sealing face of the flange and the plate.

As can be appreciated, the lack of proper compression of the O-ring and failure to obtain metal-to-metal contact results in a joint wherein leakage and O-ring extrusion can readily occur. Likelihood of joint failure, of course, is increased when the threaded openings must be formed in the field or under circumstances where it is difficult to closely maintain perpendicularity between the opening's axis and the plate surface.

The subject invention provides an improved fitting of the general type described which overcomes the above problem. Fittings formed in accordance with the invention compensate for misalignment and non-perpendicularity between the threaded opening and the surface adjacent to its outer end in a simple and effective manner.

Generally, one aspect of the invention contemplates a fitting comprising a body portion having an outwardly extending threaded end portion adapted to be threadedly received in a manner having a threaded opening which extends inwardly from a generally planar seal surface. Seal means are provided for assuring a fluid tight seal between the body and the generally planar seal surface when the end portion is threaded in the opening. The seal means include a convex, generally spherical surface carried by the body closely adjacent the threaded end portion and circumferentially thereof. An annular, relatively rigid ring member having a central opening of a diameter substantially greater than the diameter of the threaded end portion is positioned about the threaded end portion. The ring member has a concave, generally spherical surface formed on one side. The surface extends about the central opening and is sized to mate with the spherical surface carried by the body portion. The opposite side of the annular member is provided with a recess formed circumferentially about the central opening and carrying a seal member positioned in the recess for engaging the planar seal surface of the associated member when the fitting is tightened in the opening.

As can be appreciated, even when the threaded opening is not perpendicular to the planar seal surface, the annular member can shift on the body member to align itself with the seal surface to assure proper mating between the seal member and the seal surface. At no time can there be improper loading of the resilient seal ring, or lack of metal-to-metal contact between the annular member and the seal surface of the plate. Consequently, the criticality of the positioning of the threaded opening is overcome and a tight pressure sealed joint assured even in field installations.

Accordingly, a primary object of the invention is the provision of an O-seal fitting of the type described which compensate for misalignment and non-perpendicularity of the threaded opening and its surrounding seal surface.

A further object is the provision of a fitting of the type described wherein the resilient seal carrying portion of the fitting can shift relative to the body of the fitting.

Yet another object of the invention is the provision of a fitting of the general type described wherein proper compression and engagement of the O-seal member is assured without regard to the position of the threaded fitting receiving opening.

Yet another object of the invention is the provision a fitting of the general type described which is simple to manufacture and which is easy to install.

Still another object is the provision of an O-seal fitting wherein the seal ring can shift relative to the fitting to assure proper sealing engagement.

These and other objects and advantages will become apparent from the following description when read in conjunction with the accompanying drawings wherein:

FIG. 1 is a longitudinally cross-section through a preferred embodiment of the invention showing the fitting positioned in a threaded opening which is exactly perpendicular to the seal surface of the associated member;

FIG. 2 is a view similar to FIG. 1, but showing the fitting positioned in a member wherein the threaded opening is tilted at a substantial angle relative to the seal surface of the member;

FIG. 3 is an exploded pictorial view showing in detail the various components of the fitting;

FIG. 4 is an end view of the fitting taken on line 4—4 of FIG. 1; and

FIG. 5 is an end view taken on line 5—5 of FIG. 1.

Referring more particularly to FIG. 1 of the drawings, the preferred form of fitting formed in accordance with the invention is identified by the numeral 10 and shown positioned in a threaded opening 12 formed in a plate or bulkhead member 14 having a generally planar outer surface 16. As will become apparent hereafter, the particular form and arrangement of member 14 is not important to the invention so long as there is a generally planar surface extending radially outwardly about the upper or fitting receiving end of the opening 12. This portion of the surface will hereafter be referred to as the sealing surface. Obviously, the plate 14 or member 14 could have many configurations but it is shown as simply a flat plate. For example, the sealing surface surrounding opening 12 could be a raised boss or the like.

The particular fitting shown includes a body portion 18 formed of a material having the strength and/or corrosion resistant properties necessary for the particular installation and service intended. In the embodiment under consideration, the body portion 18 has a cylindrical flow passage 20 extending axially therethrough. The upper end of the body is provided with a threaded portion 22 which permits an associated pipe or tube to be connected thereto. This particular connecting arrangement for the associated tube forms no part of the invention and any standard tube fitting or pipe connection could be used. The opposite end of the fitting is provided with a threaded, outwardly extending end portion 24 which is adapted to be received in the opening 12.

As discussed earlier in the specification, prior to the present invention, a fluid tight seal was effected between the body and the plate by a radially extending flange portion having a recess formed in its lower surface. An O-ring was positioned in the recess and compressed by tightening of the fitting into the opening. As discussed, if the opening 12 was not exactly perpendicular to the seal surface of member 14, proper compression and engagement of the O-ring and the flange with the sealing surface surrounding the opening could not take place.

The subject invention overcomes this problem by an improved seal arrangement which permit automatic shifting and alignment of the O-ring carrying portion of the fitting.

The particular seal arrangement for providing a fluid and pressure tight seal between the body 18 and the sealing surface of member 14 could have a variety of specific embodiments within the scope of the invention. The preferred embodiment is as shown in FIG. 1. In particular, the seal arrangement includes a first, convex, generally spherical surface 26 carried on the body 18 and surrounding the flow passage opening 20. Although the location of the spherical surface 26 could vary, it is shown as having its center on the axial center adjacent the threaded end portion 24 of body 18.

Associated with the body 18 and arranged to engage the spherical surface 26 is an annular, relatively rigid ring member 28. As shown, the ring member 28 preferably has a concave spherical surface 30 formed generally on the inner periphery of its upper end. Surface 30 preferably has the same radius as the spherical surface 26 so as to provide close uniform surface-to-surface engagement. The lower or base end of member 28, as viewed in FIG. 1, is the seal face and has a peripheral edge or seal surface portion 32 which is continuous about the ring and lies in a single plane which is preferably perpendicular to the axis of the ring. Surface 32 is arranged to engage the seal surface of the member 14.

As can be appreciated, ring 28 can tilt and shift on the body portion 26 because of the cooperating spherical surfaces. As shown in FIG. 2, if the threaded opening 12 is tilted i.e. non-perpendicular to the seal surface on the member 14, tightening of the threaded end portion 24 into the opening 12 results in ring 28 shifting so that the seal surface 32 uniformly engages the seal surface on member 14.

In order to assure a fluid tight seal between surfaces 32 and 16, as well as between surfaces 30 and 26, resilient sealing means are positioned so as to engage the body portion 30 and surface 16. These resilient sealing means could take the form of, for example, O-rings positioned in recesses in surface 30 and surface 32; however, according to the preferred embodiment of the invention, a single O-ring member is arranged to be received within a recess 34 formed in the inner lower corner or edge of the ring member 28. Note that the recess 34 is formed in the member 28 and has a generally L-shaped cross-section relative thereto. The recess 34 in combination with the lower portion of surface 26 defines an annular groove in which a standard O-ring member 38 is received. The O-ring 38 preferably has a cross-sectional size which is somewhat larger than the size of the recess. This is best shown in the enlarged section of FIG. 1, wherein O-ring 38 is shown dotted and in its non-compressed state. Note also that in the uncompressed state, the O-ring will extend below surface 32. Accordingly, as the body portion 18 is tightened into the opening 12, the O-ring is compressed within the recess. Compression continues until surface 32 engages surface 16 of member 14. Engagement between surfaces 32 and 16 provide a tight, metal-to-metal contact which prevents extrusion of O-ring 38 under the influence of line pressure.

In order to facilitate tightening of the fitting, the body portion 18 is preferably provided with an outwardly extending flanged section 40 having tool receiving pads formed on its outer circumference. This permits a standard wrench to be used for tightening the fitting into the threaded opening 12.

As can be appreciated, the self-aligning and compensating nature of the sealing portion of the fitting overcomes problems present in the prior fittings. Note that the threaded opening 12 can have a substantial angularity relative to the sealing surface 16. This allows field installations to be made readily and without fear of a leaky joint between the fitting and the member. Clearly, many variations of the fitting could be made without departing from the scope of the invention. For example, the fitting could be a blind fitting merely used for plugging an opening. In such case, the outer connecting end portion 22 and opening 20 could be eliminated. Similarly, the particular type of wrench receiving surfaces could be eliminated and any standard type of tool receiving arrangement provided. Likewise, although the spherical surface 30 has been described as having its center located on the center line of the opening 20, the same result can be achieved with the center shifted a substantial amount from the location shown. Similarly, the concave surface of the annular member 28 can be eccentric relative to the sealing surface 32. Also, for example, the single O-ring 38 could be replaced by O-rings positioned in either of surfaces 30, 26 and surfaces 16, 32.

The invention has been described in great detail sufficient to enable one of ordinary skill and in the fitting art to make and use the same. Obviously, modifications and alterations of the preferred embodiment will occur to others upon a reading and understanding of the specification; and, it is my intention to include all such modifications and alterations as part of my invention insofar as they come within the scope of the appended claims. And, having thus described my invention, I claim:

1. A fitting comprising a body having an outwardly extending threaded end portion adapted to be threadedly received in a member having a threaded opening extending inwardly from a generally planar seal surface; seal means for providing a fluid tight seal between said body and the generally planar seal surface when said end portion is threaded in said opening; said seal means including a surface carried by said body closely adjacent the threaded end portion and circumferentially thereof; an annular, relatively rigid ring member having a central opening of a diameter substantially greater than the diameter of said threaded end portion, a surface formed on one side of said ring and extending about said central opening for engaging with the surface carried by said body portion, at least one of said body surface and said ring surface being of generally spherical configuration and arranged to permit angular relative movement between said ring and said body, the opposite side of said ring member having a recess formed circumferentially about the central opening, and a seal member positioned in said recess for engaging said planar seal surface.

2. The fitting defined in claim 1 wherein said body portion has a flow passage extending therethrough and axially aligned with said threaded end portion.

3. The fitting as defined in claim 1 wherein said body surface is of generally spherical configuration and is engaged by the seal member positioned in said recess.

4. The fitting as defined in claim 1 wherein said annular member has a peripheral edge portion formed circumferentially of said recess and lying in a single plane.

5. The fitting as defined in claim 1 including a radially extending flange positioned between the end portions of said body and provided with tool receiving pads.

6. The fitting as defined in claim 1 wherein said seal member engages the body surface adjacent said threaded end portion.

7. The fitting as defined in claim 1 wherein said surface formed on one side of said ring is of convex spherical configuration and arranged to mate with the surface carried by said body portion.

8. The fitting as defined in claim 1 wherein said surface carried by said body portion is of generally convex spherical configuration and formed integrally therewith and wherein said surface formed on said annular ring member is of concave spherical configuration.

9. The fitting as defined in claim 1 wherein said seal member comprises a resilient O-ring positioned in said recess.

References Cited
UNITED STATES PATENTS

| | | | |
|---|---|---|---|
| 2,286,566 | 6/1942 | Norton | 285—261 |
| 3,498,644 | 3/1970 | Davies et al. | 285—220 |
| 2,919,147 | 12/1959 | Nenzell | 285—220X |
| 3,292,955 | 12/1966 | Luther | 285—261 |
| 2,265,703 | 12/1941 | Simpson | 285—220 |

SAMUEL ROTHBERG, Primary Examiner